May 1, 1962

P. F. McADAMS 3,032,135

POWER STEERING MECHANISM

Filed Dec. 17, 1956

5 Sheets-Sheet 1

INVENTOR.
PAUL F. McADAMS
BY
ATTY.

May 1, 1962 P. F. McADAMS 3,032,135
POWER STEERING MECHANISM
Filed Dec. 17, 1956 5 Sheets-Sheet 4

INVENTOR.
PAUL F. McADAMS
BY
ATTY.

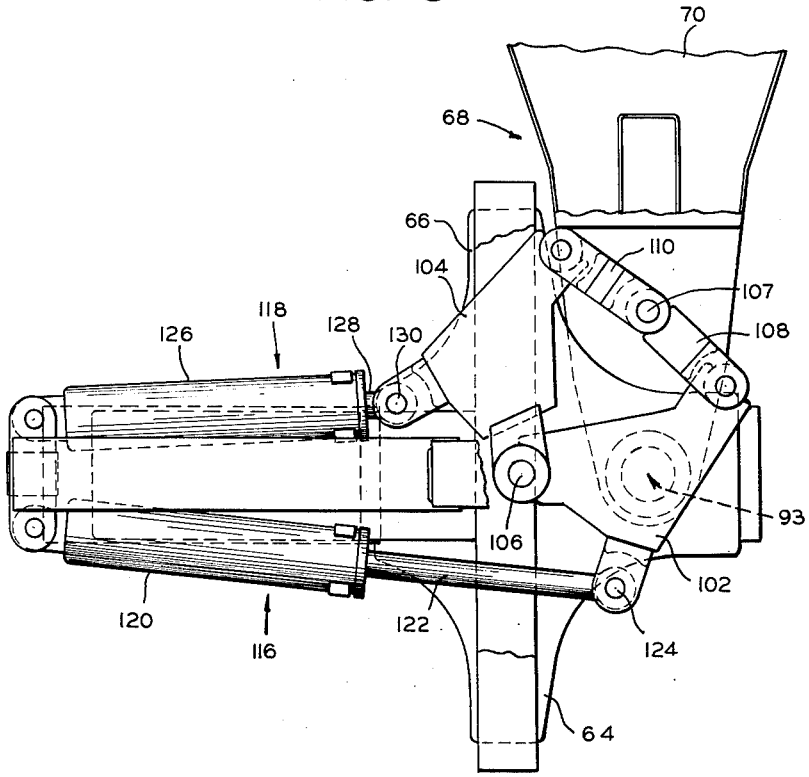

United States Patent Office 3,032,135
Patented May 1, 1962

3,032,135
POWER STEERING MECHANISM
Paul F. McAdams, St. Joseph, Mich., assignor to Clark Equipment Company, a corporation of Michigan
Filed Dec. 17, 1956, Ser. No. 628,816
5 Claims. (Cl. 180—79.2)

This invention relates to steering mechanisms for tractors and trailers, and more particularly to unitary steering and coupling mechanisms for use between a two-wheeled tractive unit and a two-wheeled material handling trailer.

It is well known to employ for off-highway vehicles a construction which comprises a two-wheeled tractor pulling a two-wheeled scraper, wagon, logger or other material handling trailer device. For such a vehicle it is necessary to provide a so-called "fifth wheel" connection between the two portions. This fifth wheel connection provides for coupling the trailer to the tractive unit so that it may be pulled thereby and it also provides for steering the vehicle by turning the tractor with respect to the trailer.

Because of the large size of vehicles for which this construction is usually employed, it is customary to effect the relative pivotal movement between the tractor and the trailer by power means such as electric motors or hydraulic actuators. It is common also in such vehicles to provide for transverse oscillation of the tractor with respect to the trailer about a longitudinal, horizontal axis to accommodate the vehicle to rough terrain.

It is highly desirable in many vehicles of this type to provide a pivotal movement about the vertical steering axis from a normal straight ahead position to at least 90° to either side, or a total steering arc of 180° or more, and the object of the present invention is to provide a rugged and reliable steering and coupling mechanism of the type described which accomplishes this purpose and which is relatively simple and inexpensive to manfacture.

In carrying out my invention in one form I provide a first coupling member mounted on the tractor and having upper and lower spaced pivot portions. A second coupling member mounted on the trailer has corresponding upper and lower spaced pivot portions which are connected respectively to the upper and lower pivot portions on the first coupling member. Power operated means for pivoting the tractor with respect to the trailer are connected between the two coupling members and operate in the space between the upper and lower pivot portions.

Figure 1:
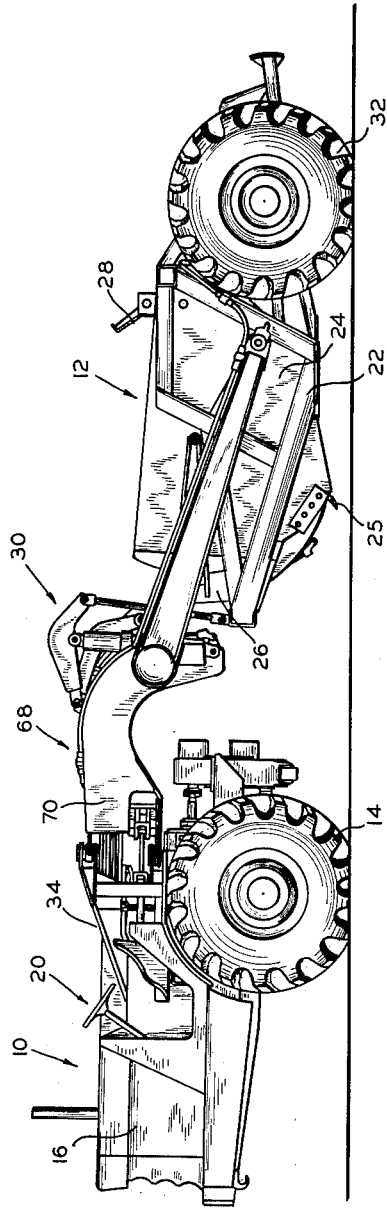
Figure 2:
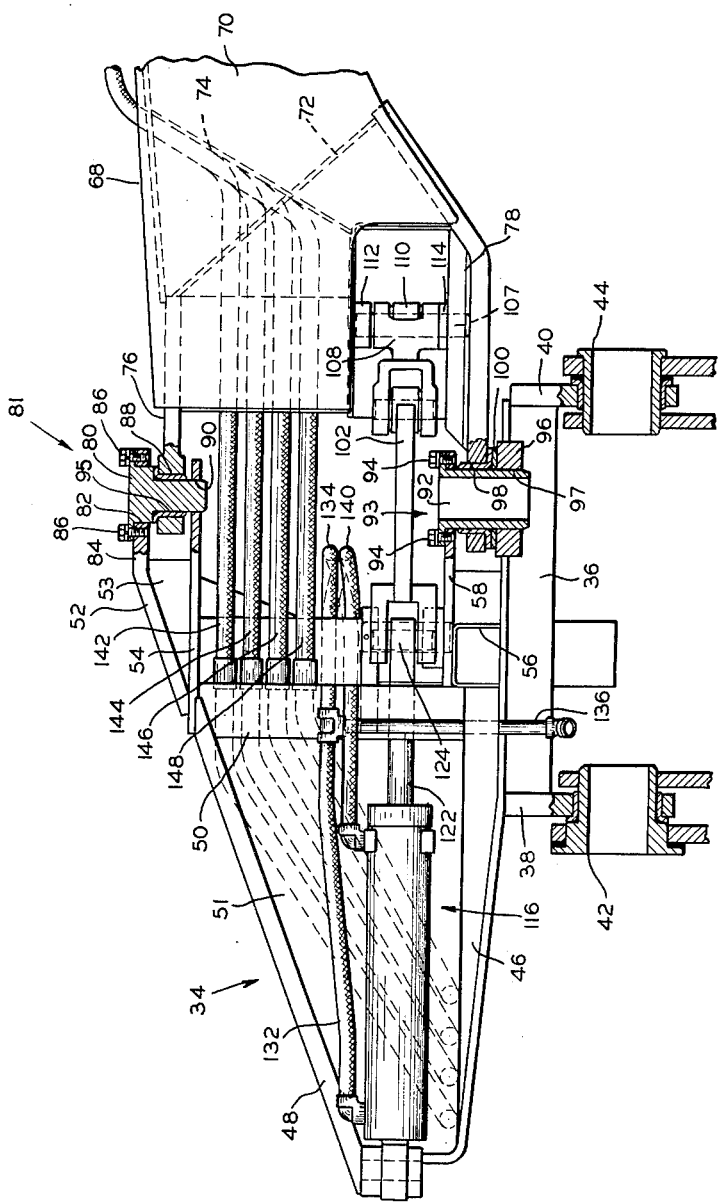
Figure 3:
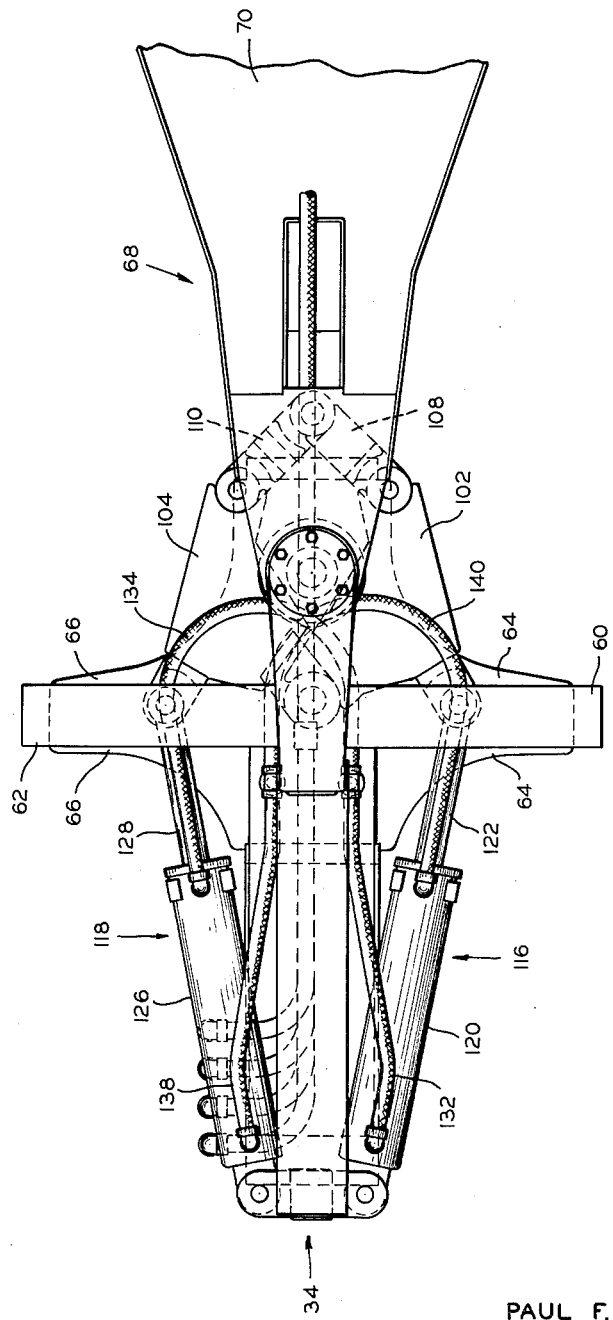
Figure 4:
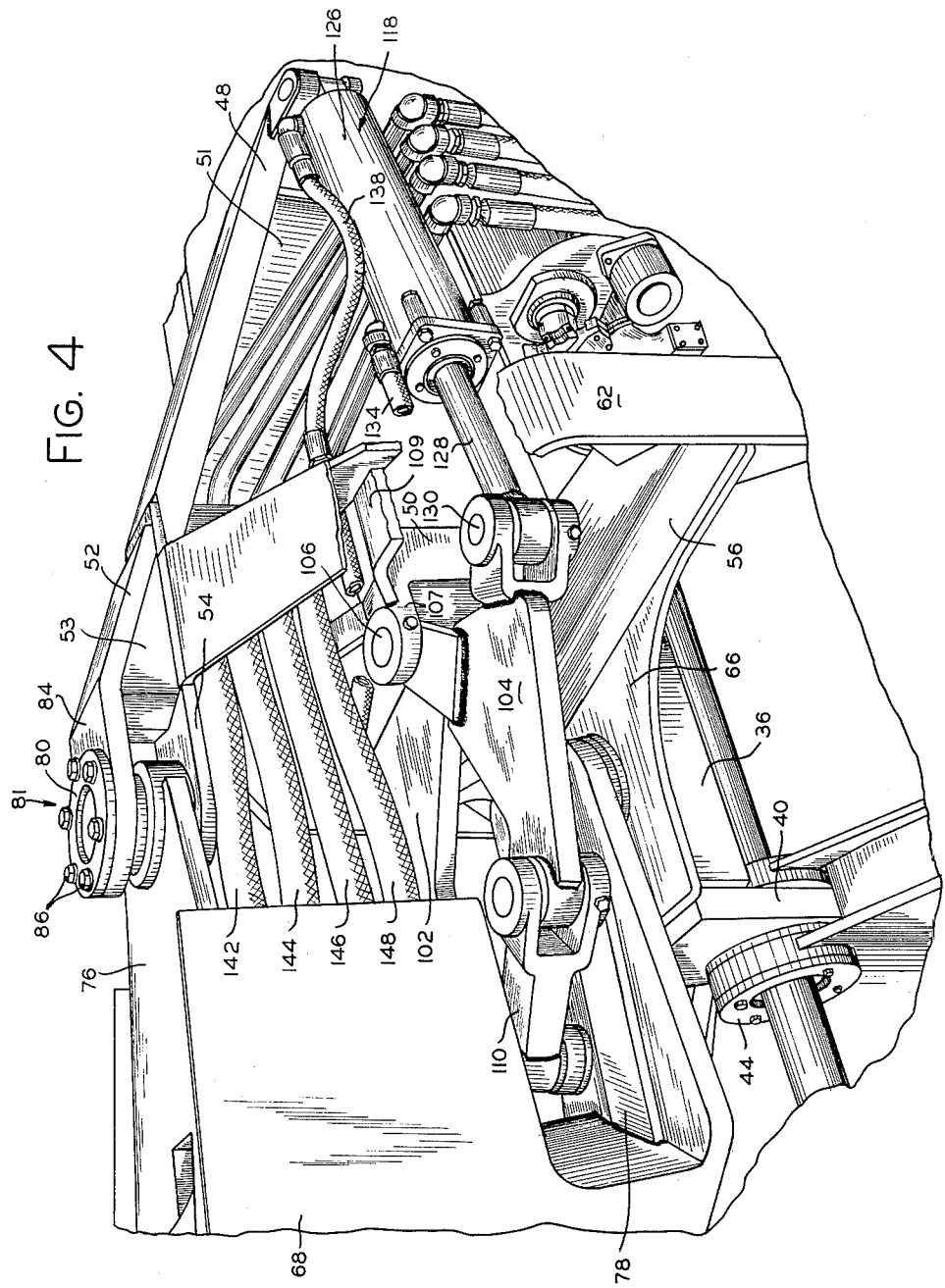

For a clearer and more complete understanding of my invention reference should be had to the accompanying drawing in which FIGURE 1 is a side elevational view of a typical tractor-drawn scraper vehicle embodying the present invention, FIGURE 2 is a side elevational view on a larger scale of the coupling and steering mechanism of the same vehicle, FIGURE 3 is a top view of the steering and coupling mechanism, FIGURE 4 is a perspective view, looking from the upper right portion of the trailer unit forwardly, downwardly and to the left at the steering and coupling mechanism, with some parts broken away, while FIGURE 5 shows the steering and coupling mechanism in position for a 90° right turn, with some of the parts omitted or broken away for the sake of simplifying the drawing.

The vehicle illustrated in FIGURE 1 of the drawing is a tractor-drawn scraper consisting of a two-wheeled tractor designated generally by the numeral 10 and a two-wheeled trailing scraper indicated generally by the numeral 12. The tractor 10 includes a pair of rubber tired wheels 14 (only one of which is visible in FIGURE 1), a prime mover within enclosure 16, an operator's station 20 and other components and mechanisms customary in a tractor of this type. The scraper unit 12, which is adapted to dig, carry and discharge earth, includes a main frame 22, a digging and carrying main bowl 24 having a transverse cutting edge 25 along the lower front edge thereof, a front apron 26 for the main bowl, and a pusher or ejector 28 for discharging the dirt. The scraper unit also includes hydraulic operating means indicated generally by the numeral 30 for the main bowl and front apron, a pair of rubber tired wheels 32 (only one of which is visible in FIGURE 1) and other parts necessary to make up a complete scraper unit of this type.

A longitudinally disposed first or trunnion coupling member (or structure) 34 is mounted on the tractor, centrally between the sides and toward the rear of the tractor. Referring to FIGURE 2 it may be seen that the structure 34 includes a horizontally disposed element 36 which has mounted at the front and rear ends thereof a pair of depending elements 38 and 40. Each of the portions 38 and 40 has a circular opening therethrough by means of which these portions are pivoted respectively on a pair of horizontally disposed circular bearing members 42 and 44, which are mounted on tractor 10. The structure just described provides means whereby the coupling member 34 is pivoted on the tractive unit 10 about a horizontally disposed longitudinal axis.

Coupling member 34 comprises a rigid structure which supports various operating parts. The rigid structure includes a horizontally disposed portion 46 which is secured in a suitable manner such as by welding to portion 36, an upwardly and rearwardly disposed portion 48 which is connected at the front (left end in FIGURE 2) to member 46, and a vertical brace member 50 which is joined solidly between the rearward ends of portions 46 and 48. A flat, vertically disposed, longitudinal brace 51 fills in the triangle formed by 46, 48 and 50. Member 34 includes a pair of rearwardly projecting portions 52 and 54 which form an upper pivot portion as described in detail hereinafter, and a portion 53 between 52 and 54. Also included in trunnion coupling member 34 is a transversely disposed channel brace member 56 and a rearwardly projecting portion 58 which cooperates with portion 36 in providing a lower pivot point as described subsequently. A pair of outwardly bowed brace members 60 and 62 are connected between portion 54 and the respective outer ends of channel 56 (see FIGURES 3 and 4). A brace portion 64 is connected between the left end (bottom end in FIGURE 3) of channel 56 and elements 36 and 46 to further strengthen first coupling member 34, while brace portion 66 is similarly connected between the other end of channel 56 and elements 36 and 46.

The second or yoke coupling member 68 on the scraper unit in this typical case is composed of a hollow structure 70 fabricated of steel sheets. The second coupling member 68 includes internal brace members 72 and 74 and a forwardly projecting member 76 near the top which provides an upper pivot portion on coupling member 68. A lower pivot portion is provided on this coupling member by means of a forwardly extending portion 78.

The two coupling members 34 and 68 are hinged together by means of pivot connections between their respective upper and lower pivot portions. The upper pivot connection is formed by means of a downwardly projecting pin or trunnion member 80 which extends downwardly through a circular opening 82 in the upper horizontally disposed portion 84 of member 52, the element 80 being secured to element 52 by means of capscrews 86. Pivot pin 80 extends downwardly through an opening 88 in portion 76 into an opening 90 in piece 54 which aids in providing rigid support for pin 80. A lining or bushing member 95 may be provided between both the cylindrical and horizontal abutting surfaces of members 80 and 76 as illustrated in FIGURE 2 to provide wear resistance for pivotal movements of pin 80 with respect to member 76.

The lower pivot point is provided by means of a hollow cylindrical pin or bearing member 92 which projects downwardly through an opening in member 58 and is connected thereto by means of capscrews 94. Member 92 extends through a circular opening in portion 78 of the trailer coupling member and into an opening 97 in a block member 96 which is connected to portion 36 and forms a portion of the rigid structure of tractor coupling member 34. For this pivot point a lining or bushing 98 is provided between the cylindrical surfaces of members 92 and 78 and between members 96 and 78. As illustrated an additional lining member 100 is provided in this case on the upper surface of member 96 to aid in transmitting to the tractor the large downward force which is exerted by yoke coupling member 68 on trunnion coupling member 34 due to the weight of and load in the scraper 12. Together, the upper and lower pivot points which I have indicated generally by the numerals 81 and 93 respectively provide for pivoting movement of the tractive unit with respect to the trailer unit about a vertically disposed axis for steering and at the same time couple the trailer to the tractive unit so that it is drawn thereby. It was brought out previously that the coupling member 34 is pivotable about the horizontal axis through members 42 and 44 whereby the trailer also may make pivoting movements about this horizontal axis to accommodate the vehicle to rough ground and the like.

To pivot the tractor with respect to the trailer about the axis through pivot pins 80 and 92 for steering the vehicle my invention includes power operated means which operate in the space between the upper and lower pivots 81 and 93. The power operated means include a pair of levers 102 and 104 of generally triangular configuration, best seen in FIGURES 4 and 5, which are pivoted on cross piece 56 of member 34 about a pin 106. The upper end of pin 106 is supported by a boss portion 107 projecting from vertical brace 50, while another transverse brace portion 109 may be provided to aid in strengthening the tractor coupling member 34. The rearward extremity of each of levers 102 and 104 is connected by means of a link to a common pivot pin 107 on the trailer and these two links are indicated respectively by the numerals 108 and 110. As may be seen in FIGURE 2, the pin 107 extends between a pair of bosses 112 and 114 which are secured by welding or the like to yoke 70 above and below the two links.

To operate the levers 102 and 104 and links 108 and 110, a pair of hydraulic piston-cylinder actuators or motors 116 and 118 are provided in this typical structure. Motor 116 comprises a cylinder 120, a piston (not shown) which operates in the cylinder, and a piston rod 122 which is connected to and operated by the piston. The piston rod 122 is pivotally connected at 124 to an intermediate point on lever 102. Similarly, motor 118 comprises a cylinder 126, a piston, and a piston rod 128 which is connected at pivot point 130 to lever 104.

Both motors 116 and 118 are double acting, and they are connected so that one of them extends when the other retracts and vice versa. As illustrated, the forward end of motor 116 and the rearward end of motor 118 are supplied with hydraulic fluid under pressure simultaneously through flexible hydraulic connection 132 and flexible hydraulic connection 134 respectively, these two hydraulic connections being supplied through a common hydraulic connection 136 which is connected to a source of hydraulic pressure under control of the operator of the vehicle. Similarly, the forward end of motor 118 and the rearward end of motor 116 are supplied with hydraulic fluid simultaneously through connections 138 and 140, respectively, with the latter two connections being supplied through a common conduit (not shown) controlled by the operator and connected to the source of hydraulic pressure. It will be appreciated, of course, that when hydraulic pressure is applied to one end of one of the hydraulic motors that the other end of that motor is opened to "bleed" to allow the piston to operate.

FIGURES 1, 2, 3 and 4 of the drawing illustrate the vehicle and the coupling and steering mechanism in the straight ahead position. If it is desired to turn the vehicle to the right motors 116 and 118 are actuated to extend the former and simultaneously retract the latter. Such action causes the levers 102 and 104 to pivot to the position illustrated in FIGURE 5. Such motion on the part of the levers moves the links 108 and 110 and coupling member 68 on the trailer to the position illustrated in which the longitudinal axis through the trailer is at approximately a 90° angle with respect to the longitudinal axis through the tractive unit. By reversing the two motors and operating them to the other extremes the unit can be made to turn to a 90° angle in the other direction. Thus a total of 180° of pivot is provided. Actually, with this mechanism, it is possible to produce more than 180° of pivot of the tractive unit with respect to the trailer and this has been demonstrated. It will be understood, of course, that any intermediate amount of pivot between the extreme pivot positions may be chosen by suitable actuation of the operator's control valve. It should be understood that in normal operation the vehicle is moving forwardly and that the vehicle is steered by operating motors 116 and 118 to change the pivotal location of the tractor with respect to the trailer. The tractor may be pivoted with respect to the trailer when the vehicle is at rest also, if desired.

While I have illustrated and described herein two hydraulic motors 116 and 118 together with two levers and two links for the steering mechanism, it will be appreciated that it is possible to achieve the same result with only one motor, one lever, and one link, such as 116, 102 and 108, for example. The use of two motors, levers and links provides a more powerful and better balanced device and smoother operation, but only half of the operating means illustrated (that is, one motor, one lever, and one link) will suffice. The important feature of my invention is that whether one or two motors, levers and links are used this power operating mechanism is arranged to operate in the space between the pivot points 81 and 93, thus providing a simple mechanism by which to achieve turns of 90° or more to each side of center.

FIGURES 1, 2, 3 and 4 of the drawing show four hydraulic lines which I have numbered 142, 144, 146 and 148. These lines supply hydraulic fluid for the operation of the hydraulic actuators on the scraper in this typical machine. The central portions of these connections, between the pivot points 81 and 93, are flexible so that they flex as the machine is steered. It will be apparent that the present construction provides very nicely for such connecting hydraulic or other lines between the tractor and the trailer, including protection by the structure (portions 60, 62, 48 and 52 of coupling member 34) which embraces them.

The use of vertically spaced pivot points 81 and 93 in this construction, in addition to providing a convenient space between the two pivot points for connecting lines between the tractor and trailer, and providing a space between the pivot points in which to locate the simple power operating means for pivoting the tractor through an angle of 180° or more, also provides another constructional advantage over other unitary coupling and steering mechanisms which employ a single king pin. With the divided pivot construction of this invention it is possible because of the greater moment arm resulting from this construction to provide a coupling and steering mechanism which better resists the large variety of forces which are produced when the tractor pulls a heavily loaded trailer over rough terrain.

While I have described and illustrated my invention herein in a preferred form embodied in a scraper drawn by a two-wheeled tractor, it will be apparent that my invention is not limited to such a vehicle but may be used with equal facility in other similar vehicles. It should be understood, therefore, that modifications may be made in my invention, and I intend to cover by the appended claims all modifications falling within the true spirit and scope of my invention.

I claim:

1. A unitary coupling and steering mechanism for a two-wheeled tractor unit and a two-wheeled trailer unit comprising, a first coupling member mounted on the tractor provided with upper and lower vertically spaced apart pivot portions, a second coupling member mounted on the trailer unit provided with upper and lower vertically spaced apart pivot portions connected respectively to the said upper and lower pivot portions on the said first coupling member, the said first and second coupling members defining a vertically disposed pivot axis through the said upper and lower pivot portions thereof, and power operated means comprising a motor, lever and link pivotally connected seriatim between the said members and arranged so that the said lever operates in the space between the said upper and lower pivot portions and at times intersects the said pivot axis whereby one said coupling member is pivoted with respect to the other said coupling member about the pivot axis to steer the tractor unit.

2. A steering mechanism for a tractor and trailer comprising, a first coupling member mounted on the tractor having upper and lower vertically spaced pivot portions, a second coupling member mounted on the trailer having upper and lower vertically spaced pivot portions connected respectively to the said upper and lower pivot portions on the first coupling member, the said first and second coupling members defining a vertically disposed pivot axis through the said upper and lower pivot portions thereof, and power operated means connected between the said members and arranged to operate in the space between the said upper and lower pivot portions for pivoting one said coupling member with respect to the other said coupling member, the said power operated means comprising a motor pivotally connected to the said first coupling member, a lever pivotally mounted on the said first coupling member arranged to move through the said pivot axis and connected to the said motor, and a link pivotally connected between the said lever and the said second coupling member.

3. A steering mechanism for a vehicle made up of a tractive unit and a trailer unit, comprising a first coupling member mounted on the tractive unit and having upper and lower vertically spaced apart pivot portions, a second coupling member mounted on the trailer and having upper and lower vertically spaced apart pivot portions connected respectively to the said upper and lower pivot portions on the said first coupling member, the said first and second coupling members defining a vertically disposed pivot axis through the said upper and lower pivot portions thereof, and power operated means connected between the said members and arranged to operate in the space between the said upper and lower pivot portions for pivoting one said coupling member with respect to the other said coupling member, the said power operated means comprising a pair of levers pivotally mounted on one of the said coupling members and arranged for movement through the said pivot axis in a horizontally disposed plane, a pair of links pivotally connected respectively between the said two levers and the other coupling member, and a pair of hydraulic motors pivotally connected respectively between the said levers and the said one coupling member.

4. A unitary steering and coupling mechanism for a vehicle composed of a tractive unit and a trailer unit, comprising a first coupling member pivotally mounted on the tractive unit to pivot about a longitudinal horizontally disposed axis, the said first coupling member having rearwardly extending upper and lower spaced apart pivot portions, a second coupling member mounted on the trailer and having forwardly extending upper and lower spaced apart pivot portions pivotally connected respectively to the said upper and lower pivot portions on the said first coupling member to form first and second pivot connections between the two coupling members, a pair of extendible and retractable actuators pivotally mounted on the forward portion of the said first coupling member and extending rearwardly, a pair of generally triangular levers pivotally mounted about a common point on the said first coupling member forwardly of a vertically disposed pivot axis through the said first and second pivot connections, the said two levers extending outwardly and to the rear from the said common mounting point when the tractive unit is in the straight ahead position, the said actuators being connected respectively to the said two levers, and a pair of links connected respectively between the rearward extremities of the said two levers and a common pivot on the said second coupling member whereby when one of the said actuators is extended and the other is retracted one of the said levers intersects the said vertically disposed pivot axis and the tractive unit is pivoted with respect to the trailer unit.

5. A steering mechanism for a tractor and trailer comprising a first coupling member mounted on the tractor having upper and lower vertically spaced pivot portions, a second coupling member mounted on the trailer having upper and lower vertically spaced pivot portions connected respectively to the said upper and lower pivot portions on the first coupling member, the said first and second coupling members defining a vertically disposed pivot axis through the said upper and lower pivot portions thereof, power operated means for pivoting one said coupling member with respect to the other said coupling member, said power operated means comprising a motor pivotally connected to one said coupling member and linkage means pivotally connected between said motor and the other said coupling member, the said linkage means comprising a lever pivotally mounted on the said one coupling member and a link pivotally connected between the said lever and the other said coupling member and a portion of the said linkage means arranged to operate through the said pivot axis.

References Cited in the file of this patent

UNITED STATES PATENTS

| 2,189,072 | LeTourneau | Feb. 6, 1940 |
| 2,258,396 | LeTourneau | Oct. 7, 1941 |
| 2,426,652 | Storey | Sept. 2, 1947 |
| 2,614,644 | Gustafson | Oct. 21, 1952 |
| 2,638,998 | Rockwell | May 19, 1953 |